INVENTORS
CARL T. KLEM
LOREE A. D. PAULSON

INVENTORS
CARL T. KLEM
LOREE A. D. PAULSON

INVENTORS
CARL T. KLEM
LOREE A. D. PAULSON

INVENTORS
CARL T. KLEM
LOREE A. D. PAULSON

Aug. 22, 1967  C. T. KLEM ETAL  3,336,991
DRILL ROD STORAGE AND HANDLING APPARATUS
Filed Sept. 27, 1965  9 Sheets-Sheet 7
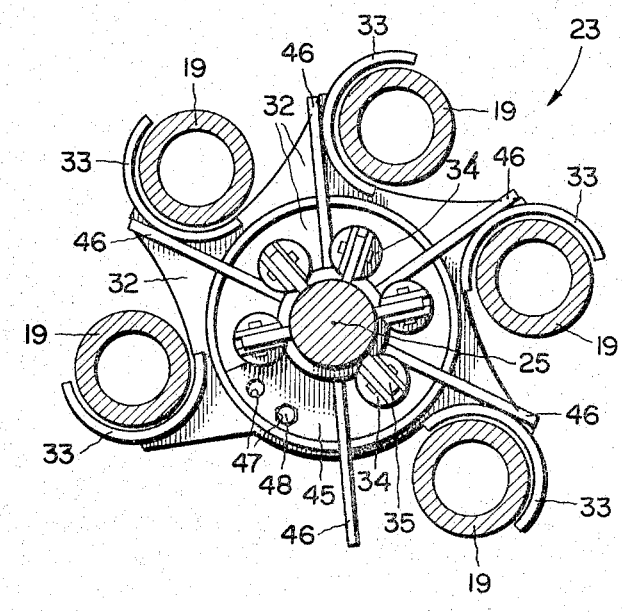
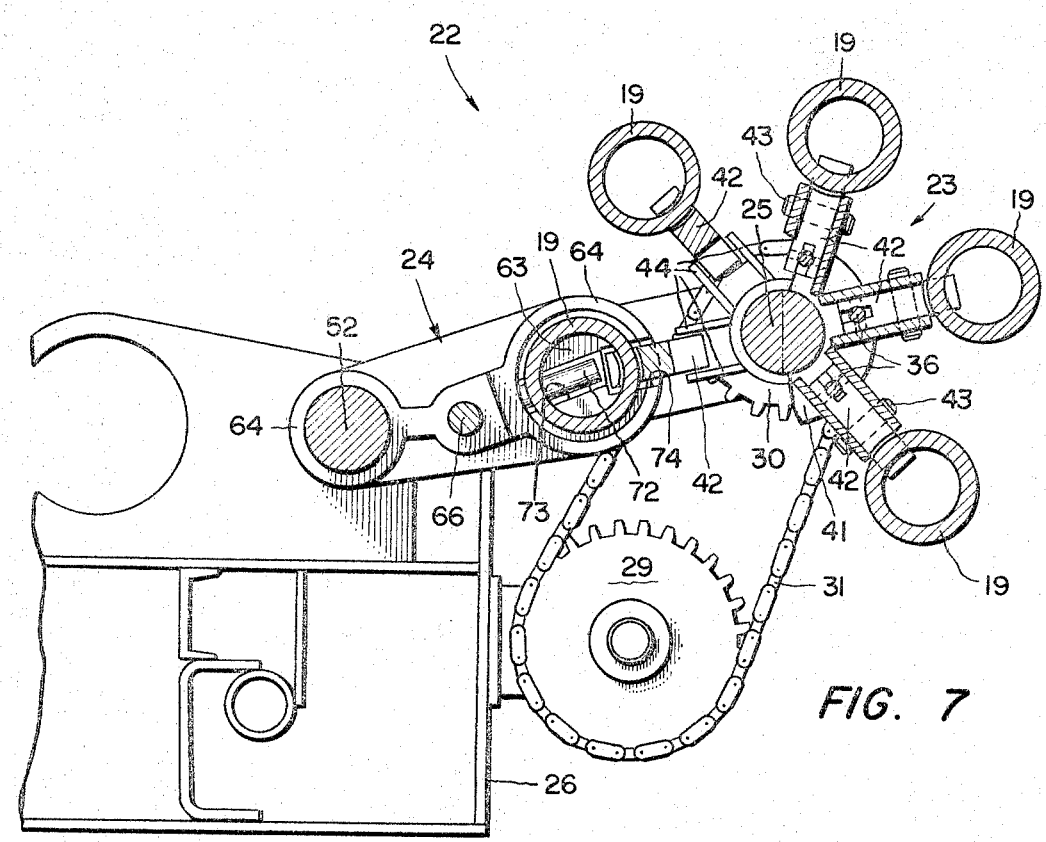

INVENTORS
CARL T. KLEM
LOREE A. D. PAULSON

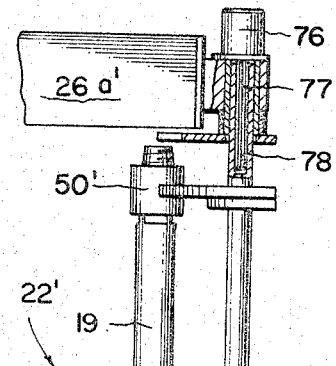
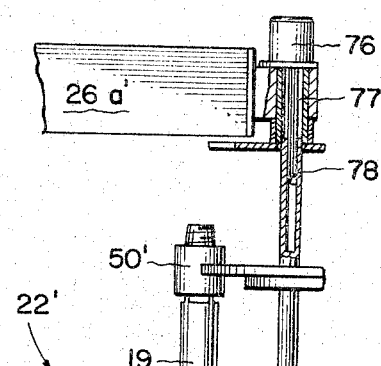
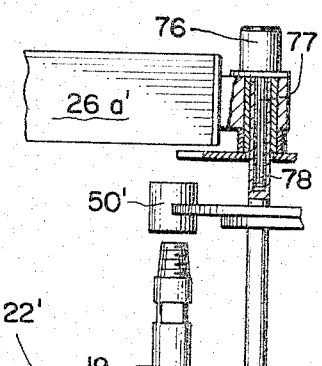
FIG. 10  FIG. 11  FIG. 12
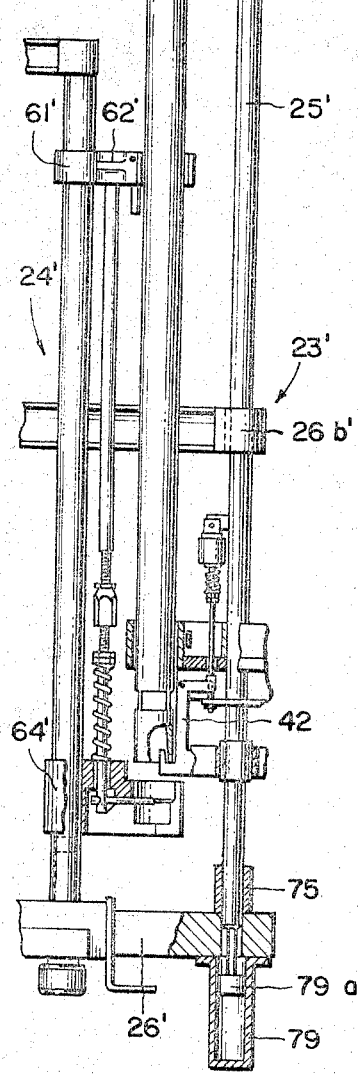
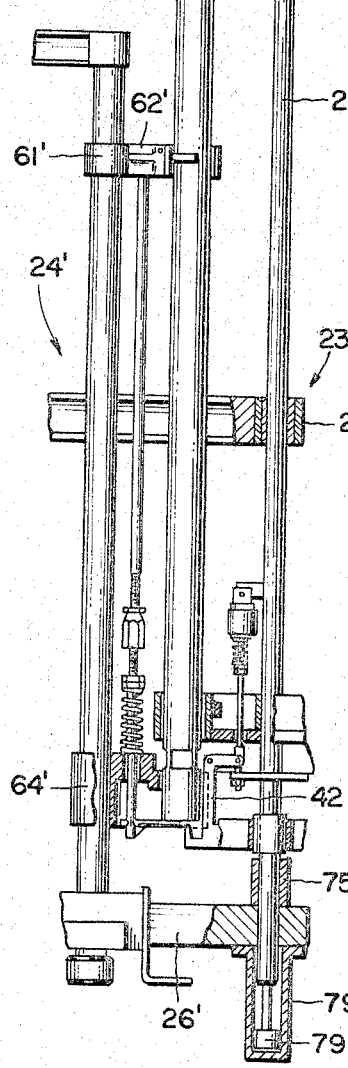
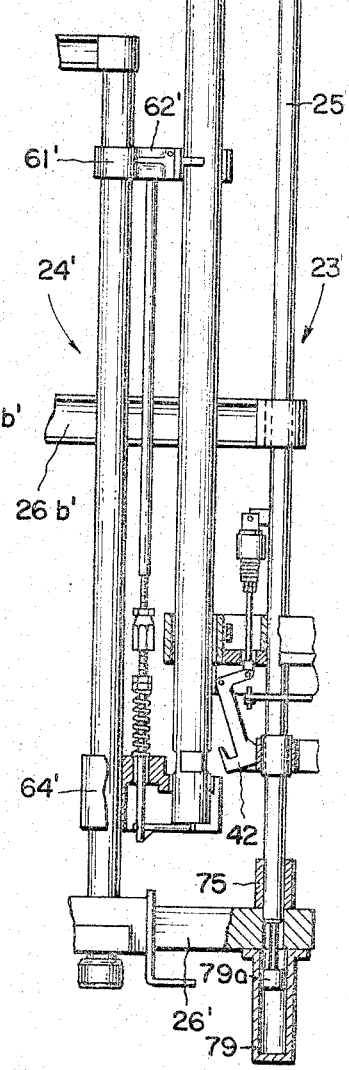

United States Patent Office 3,336,991
Patented Aug. 22, 1967

3,336,991
DRILL ROD STORAGE AND HANDLING APPARATUS
Carl T. Klem, Riegelsville, Pa., and Loree A. D. Paulson, Phillipsburg, N.J., assignors to Ingersoll-Rand Company, New York, N.Y., a corporation of New Jersey
Filed Sept. 27, 1965, Ser. No. 490,598
9 Claims. (Cl. 175—85)

This invention relates to drilling apparatus and has more particular reference to the provision of a new and improved apparatus for storing and handling a plurality of drill rods.

Conventionally, numerous forms of devices have been provided for storing a plurality of drill rods in operative relation to a drilling apparatus drilling a hole. Usually, however, these devices are constructed in the form of a rack which stores the drill rods out of alignment with the drill hole and is swung over the drill hole for the transfer of a drill rod between the rack and the drilling head of the drilling apparatus. Thus, conventionally, it is usually necessary that the entire rack and all of its carried drill rods be moved over the drill hole in order that a single drill rod may be transferred between the rack and the drilling apparatus.

This movement of the entire rack and all of its carried rods over the drill hole is, however, undesirable in that it requires extensive, extremely complicated mechanisms for the alignment and indexing of the drill rods with the drilling head. Furthermore, this movement of the rack is objectionable from the standpoint of operator safety, and makes the utilization of such a rack extremely difficult when the drilling tower supporting the drilling head is at an angle, as for angle hole drilling.

An object of the present invention is to provide a new and improved apparatus for storing and handling a plurality of drill rods which is constructed and arranged such that only a drill rod being transferred between the storage apparatus and the drilling head is moved over the drill hole.

Another object of the invention is to provide a new and improved drill rod storage and handling apparatus of the type set forth which is constructed and arranged such that one man working alone may readily and speedily transfer drill rods between the storage apparatus and the drill head.

Another object is to provide a new and improved drill rod storage and handling apparatus of the type set forth which permits angle hole drilling by the drilling head.

Another object is to provide a new and improved drill rod storage and handling apparatus of the type set forth which, although relatively simple and economical in construction, is efficient and dependable in operation.

Other objects and advantages of the invention will be apparent from the following description taken in conjunction with the accompanying drawings. It will be understood that changes may be made in the details of construction and arrangement of parts shown and described as the preferred forms of the invention have been given by way of illustration only.

Referring to the drawings:

FIG. 7 is a sectional view of the storage and handling apparatus taken on line 7—7 of FIG. 3, looking in the direction of the arrows;

FIG. 8 is a sectional view of the storage and handling apparatus taken on line 8—8 of FIG. 3, looking in the direction of the arrows;

FIGS. 10 through 12 are partially broken away and in section, fragmentary elevational views of an alternative embodiment of the storage and handling apparatus showing the removal of a drill rod from the storage apparatus thereof.

Figure 1:
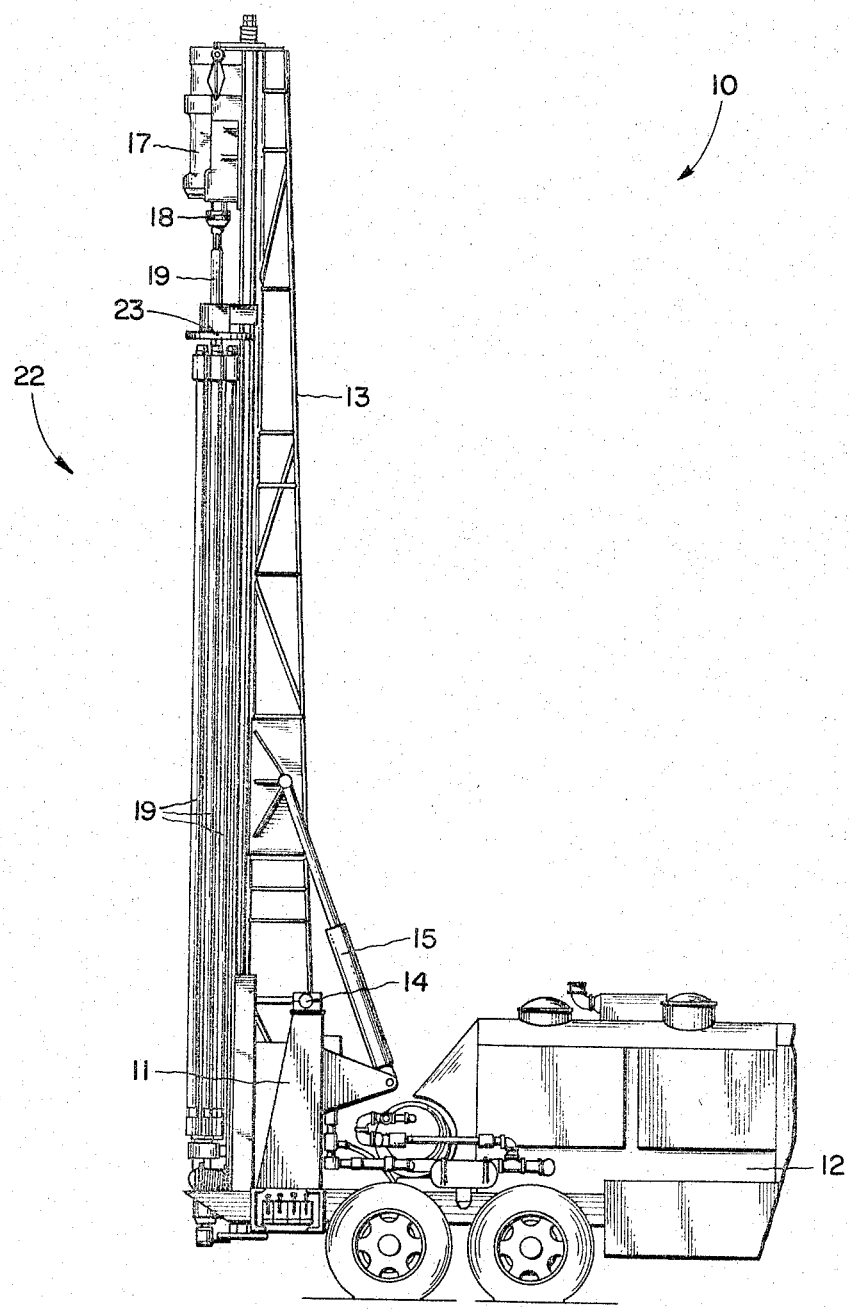
FIG. 1 is an elevational side view of a rock drilling apparatus including the drill rod storage and handling apparatus provided by the present invention.
Figure 2:
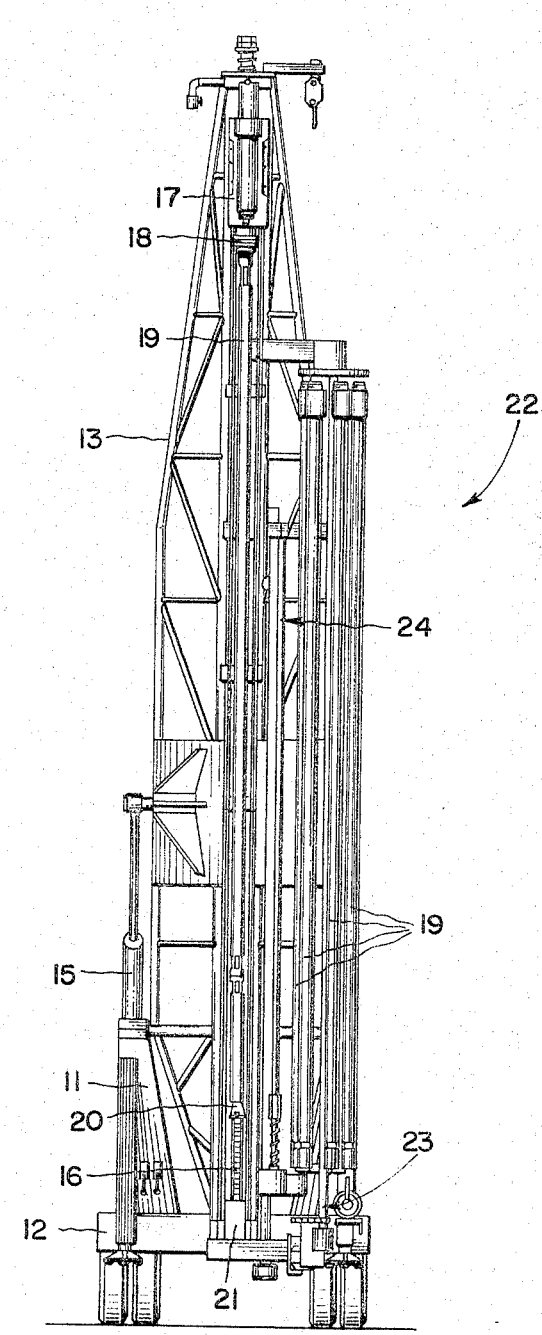
FIG. 2 is an elevational end view of the rock drilling apparatus shown in FIG. 1.

Referring more particularly to the drawings wherein similar reference characters designate corresponding parts throughout the several views, FIGS. 1 and 2 illustrate a rock drilling apparatus designated generally at 10 which is carried by a supporting frame 11 mounted upon a ground supported mobile base 12. The rock drilling apparatus 10 comprises a drilling tower 13 which is pivotally connected at 14 to the supporting frame 11 and is pivotable thereabout between a vertical position and a substantially horizontal position upon the actuation of a plurality of fluid cylinders 15 operatively connected between the supporting frame 11 and the tower 13. As illustrated in FIGS. 1 and 2, the tower 13 is in its vertical or drilling position relative to the mobile base 12; and it will be understood that all of the following description, unless otherwise specifically stated, has been given with regard to the tower 13 in its vertical position.

A continuous sprocket chain 16 is longitudinally mounted about the longitudinal axis of the tower 13 and fixedly carries a rotary drilling head or drill motor 17 which is preferably of the pneumatic reversible type. The sprocket chain 16 is longitudinally movable around the tower 13 upon the actuation of a feed motor (not shown) carried by the tower 13 to vertically move the rotary drilling head 17 relative to the hole being drilled by the rock drilling apparatus 10. The rotary drilling head 17, as illustrated in FIGS. 1 and 2, is connected through a rotary coupling 18 to a drill rod 19 carrying a drilling bit 20 upon its lower end and, during the transportation of the mobile base 12, carries the drill rod 19 which serves as the starter rod. During the operation of the rock drilling apparatus 10, the rotary drilling head 17 drives a string of longitudinally aligned drill rods 19 through a centralizer or guide 21 into the drill hole in the conventional manner.

The apparatus which is provided by the present invention for storing and handling the drill rods 19 which form the drill string is designated generally at 22 and is supported by the tower 13 in operative relation to the rotary drilling head 17. As will be seen from FIGS. 1 and 2, the storage and handling apparatus 22 comprises, in brief, a drill rod carrier or rack 23 adapted to support the drill rods 19 out of axial alignment with the rotary drilling head 17 and a drill rod changer 24 adapted to transfer the drill rods 19 between the rod carrier 23 and the rotary drilling head 17.

The rod carrier 23, as illustrated in FIGS. 1 through 9, comprises a vertically extending, tubular supporting member 25 which is rotatably journalled at its upper and lower ends and adjacent its longitudinal midpoint in the supporting arms 26a, 26 and 26b, respectively, which project transversely from the tower 13. The supporting arm 26 carries a hydraulic actuator 27 which is operatively connected to transmit bidirectional rotation to a shaft 28 having a toothed sprocket wheel 29 keyed thereon. The tubular suporting member 25 has a toothed sprocket wheel 30 keyed thereon in horizontal alignment with the sprocket wheel 29, the sprocket wheels 29 and 30 being operatively connected by a continuous roller chain 31 to transmit rotation from the shaft 28 to the tubular supporting member 25.

Figure 3:
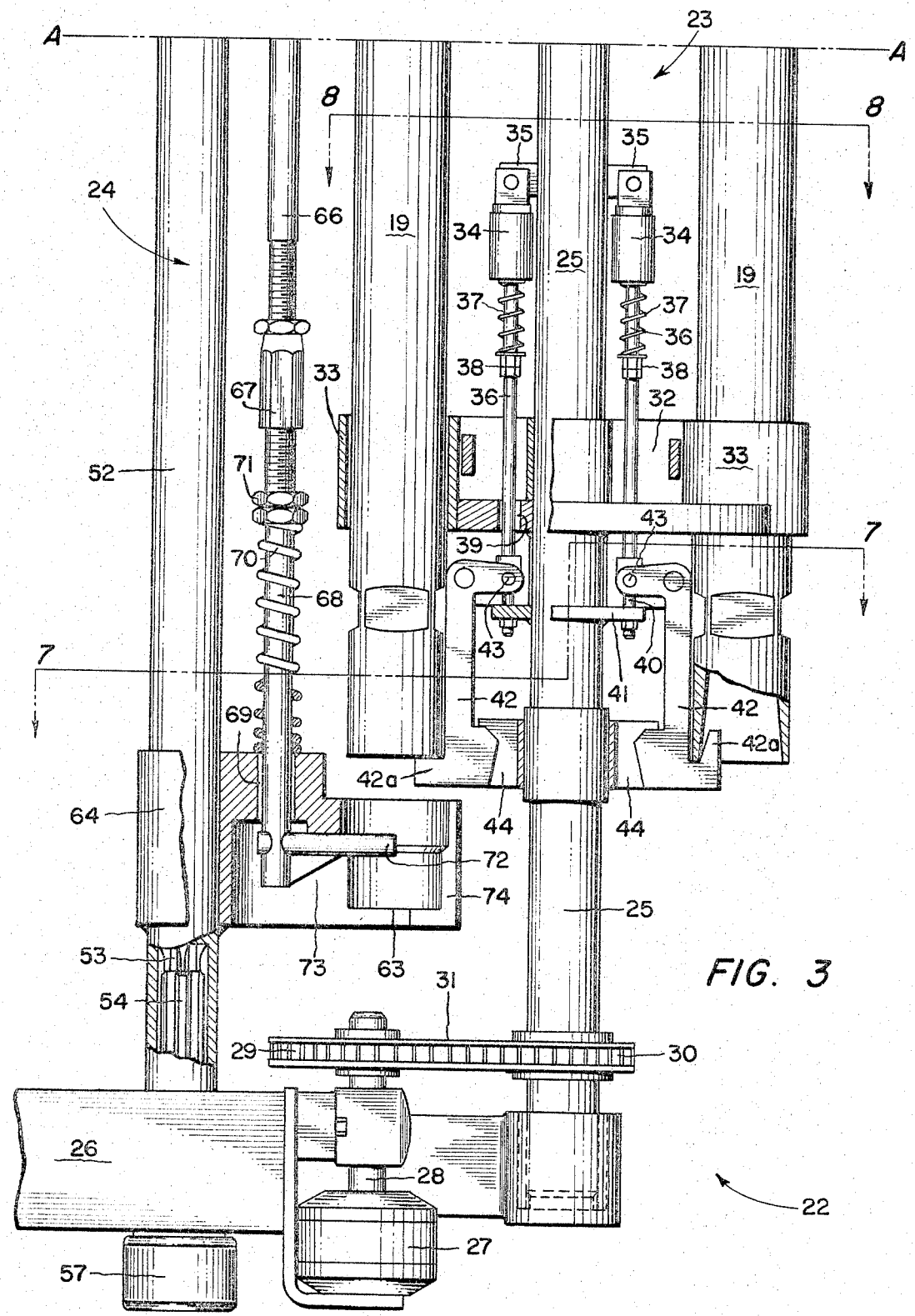
FIG. 3 is an enlarged, partially broken away and in section, fragmentary view illustrating the lower portion of the drill rod storage and handling apparatus of the invention.
Figure 3A:
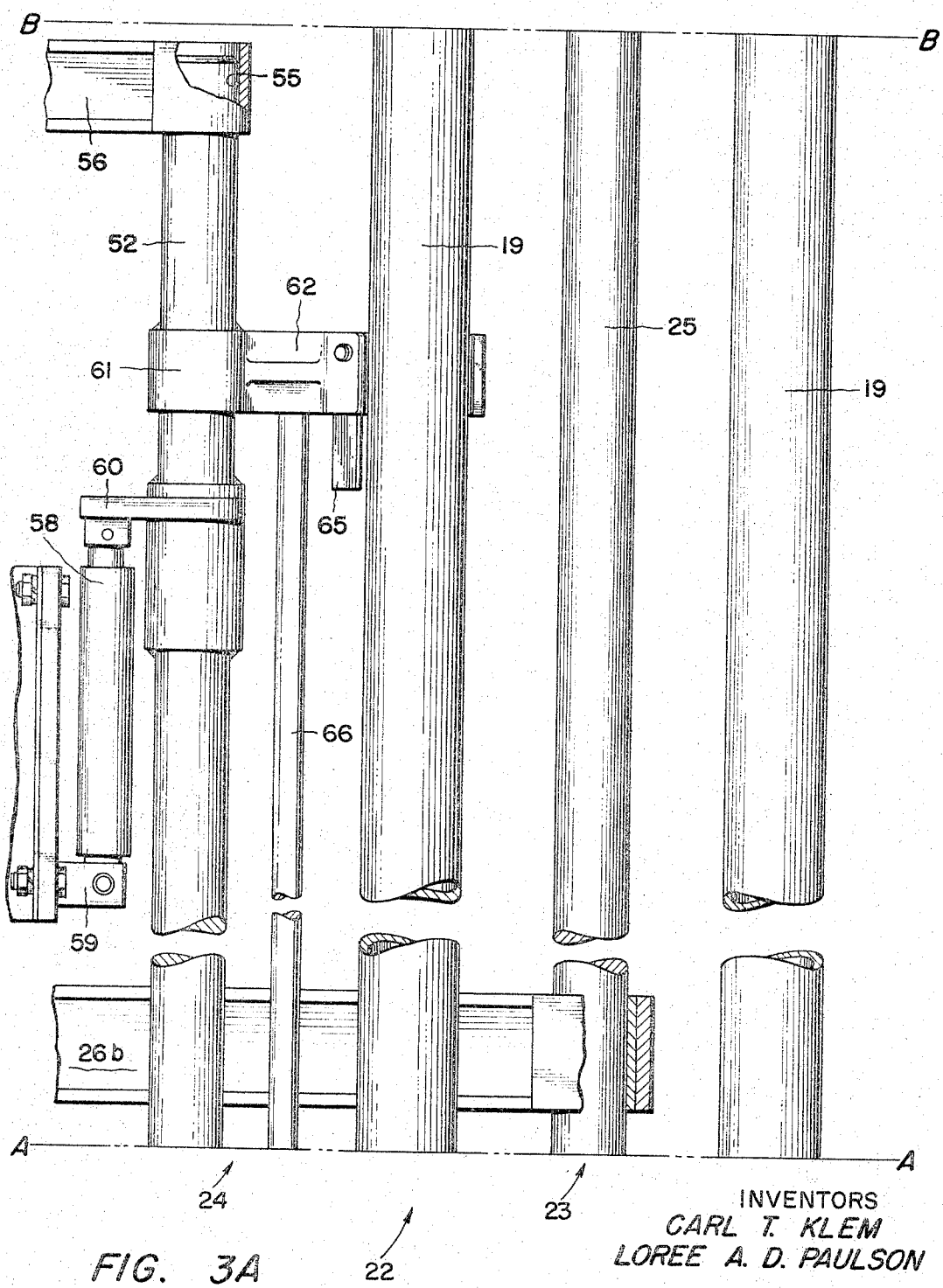
FIG. 3A is an enlarged fragmentary view showing the portion of the drill rod storage and handling apparatus located immediately above line A—A of FIG. 3.

The lower end of the tubular suporting member 25, as illustrated in FIG. 3, fixedly carries a supporting bracket 32 having a plurality of arcuately arranged circumferential supports 33. The supports 33 are each adapted to arcuately surround the lower end of a drill rod 19 and are of sufficient radius to permit longitudinal movement of the drill rods 19 relative to the tubular supporting member 25. As illustrated, the supports 33 are five in number and are arranged around only a portion of the circumference of the lower supporting bracket 32. It will be understood, however, that this illustrated number and arrangement of the supports 33 has been given by way of illustration only, and that the supports 33 may be of other suitable number and arrangement without departing from either the spirit or the scope of the invention.

A pneumatic cylinder 34 is carried above each of the supports 33 by a lug 35 which is disposed on the tubular supporting member 25 above the supporting bracket 32. The pneumatic cylinders 34 are each operatively connected to one end of an extension rod 36 and are connected in series through a single control valve (not shown) to a common source of compressed air to retract the extension rods 36, in the absence of a load thereon, upon the flow of the compressed air. Each of the extension rods 36 is biased from its respective pneumatic cylinder 34 by a spring 37 located intermediate the pneumatic cylinder 34 and a collar 38 circumferentially around the extension rod 36 and is returned thereby. Each of the extension rods 36 projects through an opening 39 formed through the supporting bracket 32 into longitudinal abutting relationship with a limiting shaft 40 threaded through a flange 41 fixedly carried by the tubular supporting member 25 below the supporting bracket 32. The limiting shafts 40 limit the downward movement transmitted from the springs 37 to the extension rods 36 and vertically position the free ends of the extension rods 36 below the supporting bracket 32. It will be seen that adjustment of the threading of the limiting shafts 40 into the flanges 41 provides simultaneous adjustment of the extreme downward position of the free ends of the extension rods 36 to vary the extent of the downward movement transmittable from the springs 37 to the extension rods 36.

A rod holder latch 42 is pivotally connected at 43 to the free end of each of the extension rods 36 and includes a hook-type supporting portion 42a projecting below one of the supports 33 on the supporting bracket 32. The hook-type supporting portions 42a, as will be seen from FIG. 3, engage the lower ends of the drill rods 19 which are supported by the rod carrier 23 to lock the drill rods 19 from downward longitudinal movement through the supports 33. A rod holder latch guide 44 is fixedly supported by the tubular supporting member 25 adjacent each of the hook-type supporting portions 42a to guide the rod holder latches 42 during their pivotal movement upon the extension rods 36. The rod holder latch guides 44 insure that the hook-type supporting portions 42a are constantly returned to locking relationship with the drill rods 19 upon the engagement of the limiting shafts 40 by the extension rods 36.

As will be seen from FIG. 8, a locking ring 45 is supported by the tubular supporting member 25 immediately above the supporting bracket 32. The locking ring 45 includes a plurality of radially extending locking plates 46 adapted to cooperate with the supports 33 to prevent the drill rods 19 from moving transversely therefrom. The locking ring 45 is rotatable upon the tubular supporting member 25 to alternatively position the locking plates 46 in locking relation against the drill rods 19 or in arcuately spaced relationship thereto. A pair of arcuately spaced openings 47 are provided in the locking ring 45 and are adapted to be alternatively aligned with a single opening (not shown) formed in the supporting bracket 32 upon the rotation of the locking ring 45 to locate the locking plates 46 in said locking and spaced positions relative to the drill rods 19. The opening 47 which is aligned with the opening in the supporting bracket 32 receives a single fastening means such as the hexagon head bolt 48 therewith to secure the locking plates 46 in their locking or, alternatively, their spaced positions. Thus, the locking plates 46 may be positioned to lock the drill rods 19 from transverse movement from the supports 33 when the tower 13 is in its substantially horizontal position, such as while the mobile base 12 is being transported, yet readily and simply repositioned to unlock the drill rods 19 when the rock drilling apparatus 10 has been moved to a drilling site and the tower 13 raised to its illustrated vertical position.

Figure 3B:
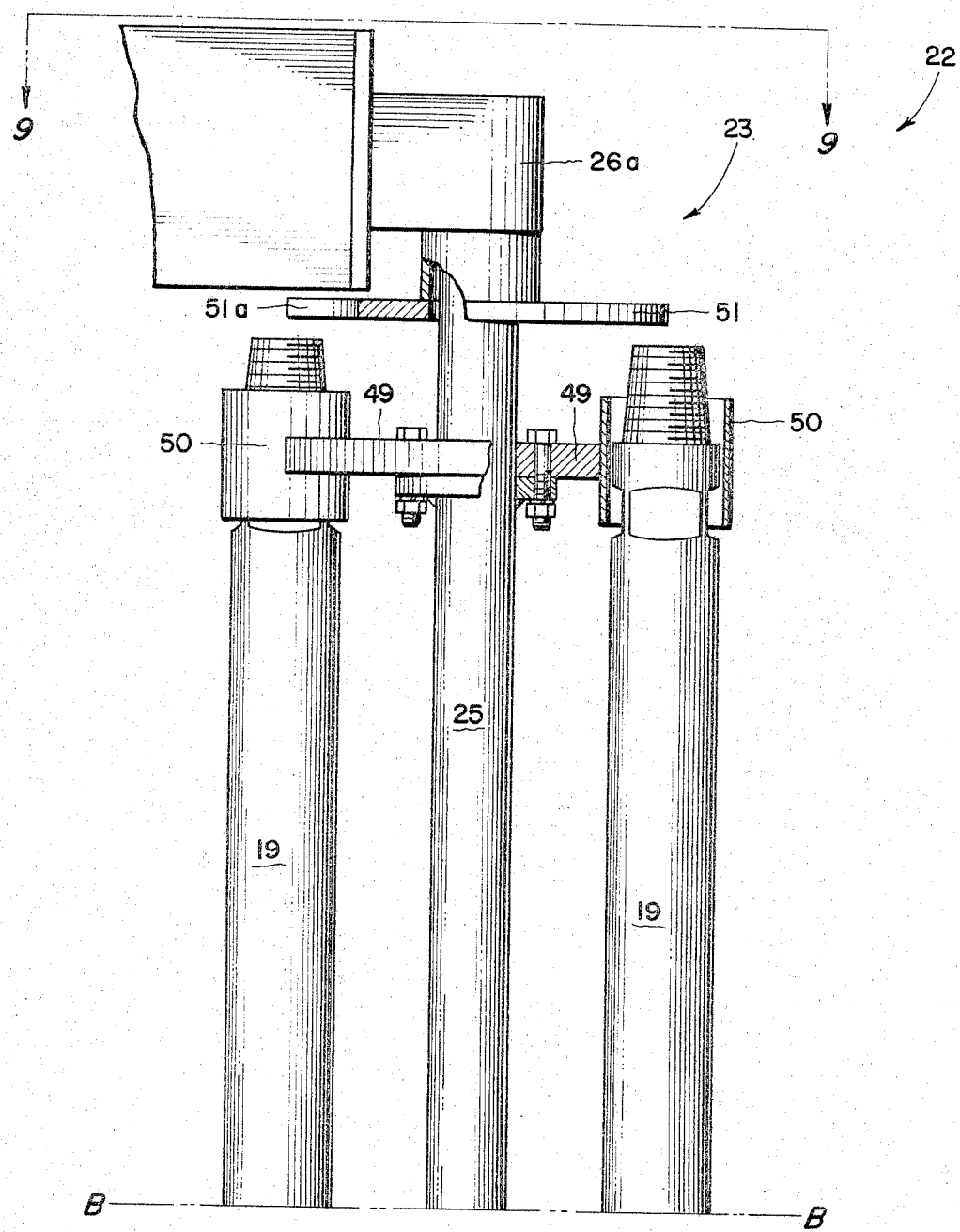
FIG. 3B is an enlarged fragmentary view showing the upper portion of the drill rod storage and handling apparatus located immediately above line B—B of FIG. 3A.

The upper end of the tubular supporting member 25, as will be seen from FIG. 3B, fixedly carries a supporting bracket 49 adapted to support the upper ends of the drill rods 19 which are carried by the rod carrier 23. The supporting bracket 49 comprises a plurality of tubular supports 50 which are arcuately arranged around the tubular supporting member 25 in axial alignment with the supports 33 on the supporting bracket 32. The supports 50 each internally receive the upper end of a drill rod 19 which is supported at its lower end by the aligned support 33 on the supporting bracket 32 and are adapted to allow longitudinal movement of the drill rods 19 relative to the tubular supporting member 25.

The supporting arm 26a which supports the upper end of the tubular supporting member 25 carries a limiting plate 51 which extends vertically over the drill rods 19 in spaced relationship thereto. The limiting plate 51 restricts the longitudinal movement of the drill rods 19 through the supports 50 to prevent the drill rods 19 from passing off the rod carrier 23 when such is in substantially horizontal position upon the mobile base 12. An arcuate portion 51a of the limiting plate 51 is cut away, however, to allow individual longitudinal movement of the drill rods 19 during the operation of the storage and handling apparatus 22.

The rod changer 24 which is provided by the present invention for transferring the drill rods 19 between the rod carrier 23 and the rotary drilling head 17 is longitudinally supported by the tower 13 intermediate the rod carrier 23 and the rotary drilling head 17. The rod changer 24, more specifically, comprises a supporting post 52 which is supported at its lower end by a spline connection 53 with a shaft 54 rotatably carried by the supporting arm 26 and at its upper end by a slidable connection 55 with a supporting arm 56 projecting transversely from the tower 13. The supporting post 52 is limitedly rotatable relative to the rod carrier 23 and the rotary drilling head 17 by a fluid motor such as the 180° hydraulic actuator 57 which is operatively connected to rotate the shaft 54. The supporting post 52, as illustrated in FIGS. 1 through 9, also is longitudinally movable a limited distance, such as for example ten inches, relative to the rod carrier 23 and the rotary drilling head 17 by a hydraulic cylinder 58 which is pivotally connected at its opposing longitudinal ends to a flange 59 carried by the tower 13 and a flange 60 upon the supporting post 52. The hydraulic actuator 57, the hydraulic cylinder 58, and the hydraulic actuator 27 for rotating the rod carrier 23 may, if desired, be controlled by a single threespool hydraulic valve (not shown).

An upper drill rod support 61 is carried by the supporting post 52 adjacent the upper end thereof and includes an arcuate supporting portion 62. The supporting portion 62 is in vertical alignment with a supporting portion 63 formed within a lower drill rod support 64 mounted adjacent the lower end of the supporting post 52. A latch or locking member 65 is pivotally carried by the upper drill rod support 61 for closing the open side of the supporting portion 62 to retain a drill rod 19 therein and is mechanically connected to one end of a first connecting rod 66 to be actuated by downward movement thereof. The first connecting rod 66 extends vertically downwardly from the upper drill rod support 61 and is threaded at its opposing end into a coupling member 67 which longitudinally connects such with a second connecting rod 68 threaded into the opposing end of the coupling member 67. The second connecting rod 68 extends into a slot 69 formed vertically through the lower drill rod support 64 and is biased towards the upper drill rod support 61 by a spring 70 located intermediate the lower drill rod support 64 and a collar 71 fixedly carried by the second connecting rod 68. The second connecting rod 68, furthermore, carries a trigger rod 72 which extends through a slot 73 formed in the lower drill rod support 64 into the supporting portion 63 thereof. The trigger rod 72 is actuable by the weight of a drill rod 19 located within the supporting portion 63 to move the second connecting rod 68 downwardly against the spring 70, thereby also moving the first connecting rod 66 downwardly and actuating the locking member 65 to close the open side of the supporting portion 62 of the upper drill rod support 61.

The supporting portion 63 of the lower drill rod support 64 is adapted to be located below a drill 19 which is carried by the rod carrier 23 and to receive the drill rod 19 upon upward longitudinal movement of the supporting post 52. A transverse slot 74 is formed through the lower drill rod support 64 in communication with the supporting portion 63 to receive the rod holder latch 42 supporting the drill rod 19 during such longitudinal movement of the supporting post 52. The slot 74 permits the lower drill rod support 64 to raise the drill rod 19 vertically above the rod holder latch 42 whereupon such may be pivoted towards the tubular supporting member 25 of the rod carrier 23. During the transportation of the mobile base 12, a drill rod 19 may be stored upon the rod changer 24, thereby increasing the number of drill rods 19 which may be stored upon the storage and handling apparatus 22 to six in addition to the starter drill rod 19 which is directly carried by the rotary drilling head 17 in operative drilling position.

Figure 4:
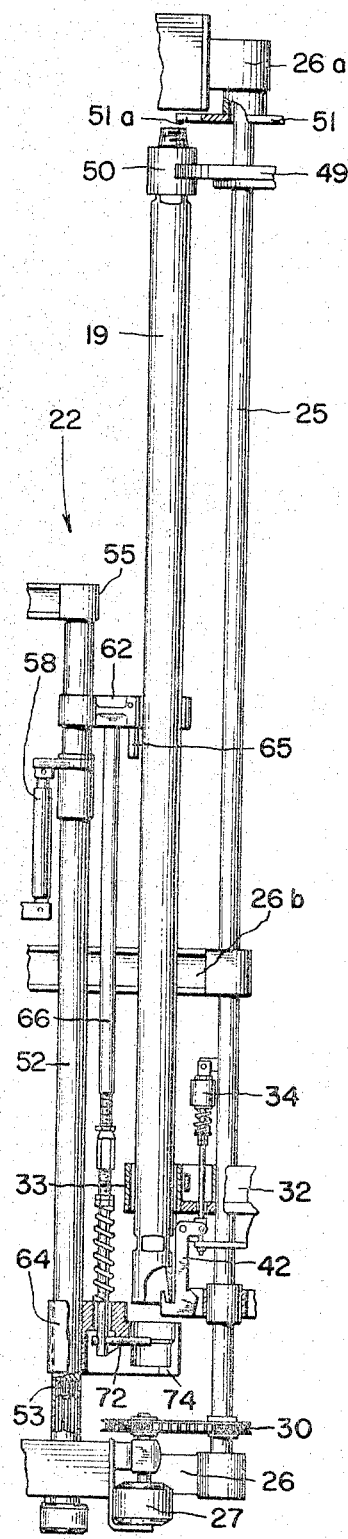
FIGS. 4 through 6 are partially broken away and in section, fragmentary elevational views of the drill rod storage and handling apparatus illustrating the removal of a drill rod from the storage apparatus thereof.

In the operation of the beforedescribed storage and handling apparatus 22, the starter drill rod 19 which is stored in alignment with the rotary drilling head 17 and the drill rod 19 which is stored in the rod changer 24 are first added to the drill string in the drill hole. Then, to add another drill rod 19 to the drill string, the rod changer 24 is rotated by the hydraulic actuator 57 to locate the aligned upper and lower drill rod supports 61 and 64, respectively, adjacent the rod carrier 23. The rod carrier 23 is rotated in a clockwise direction by the hydraulic actuator 27 until the leading drill rod 19 therein engages and is received by the upper drill rod support 61 on the rod changer 24, as shown in FIG. 4.

Figure 5:
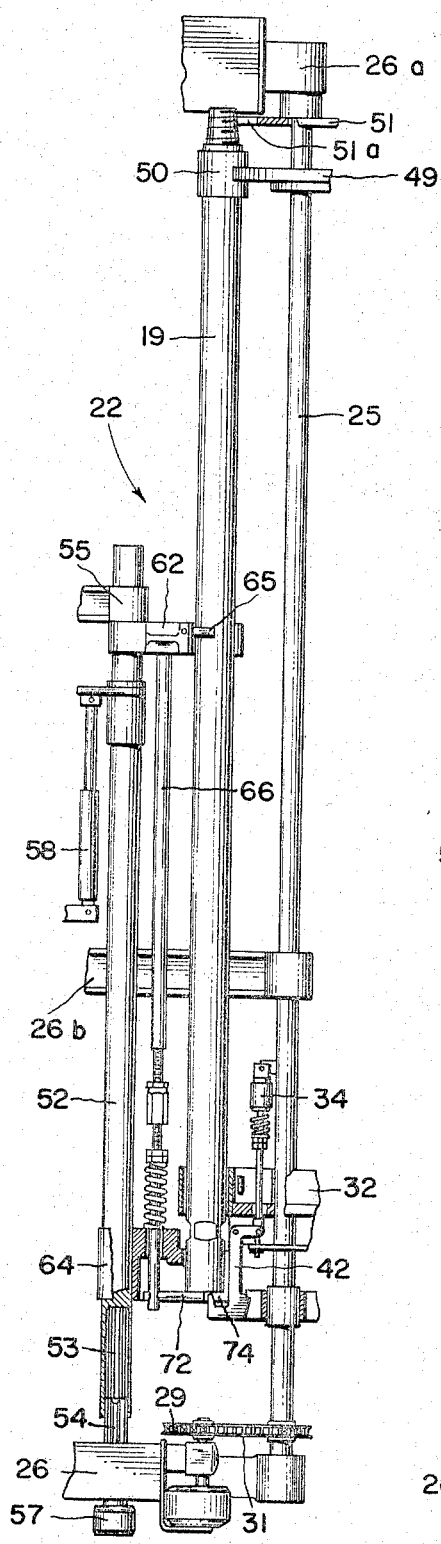
Figure 6:
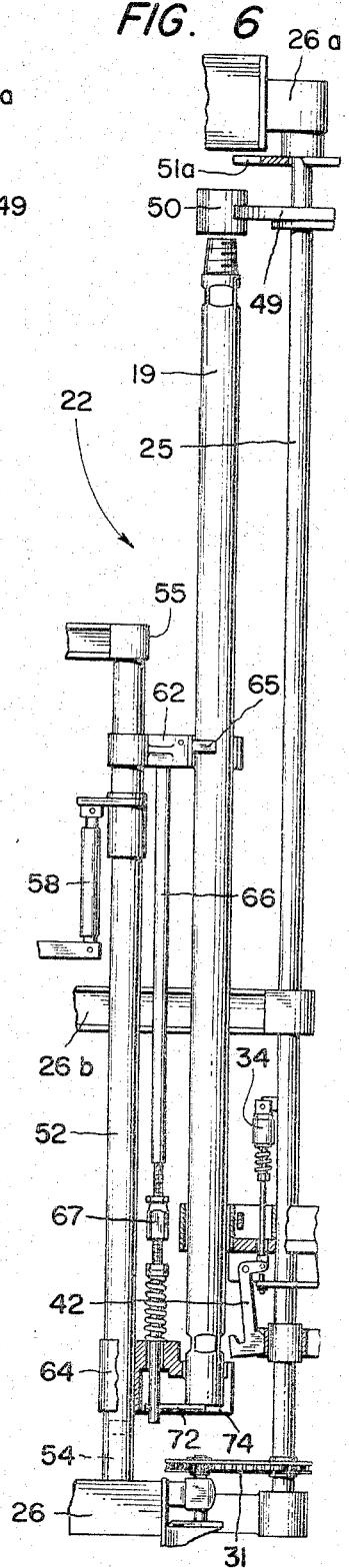
Figure 9:
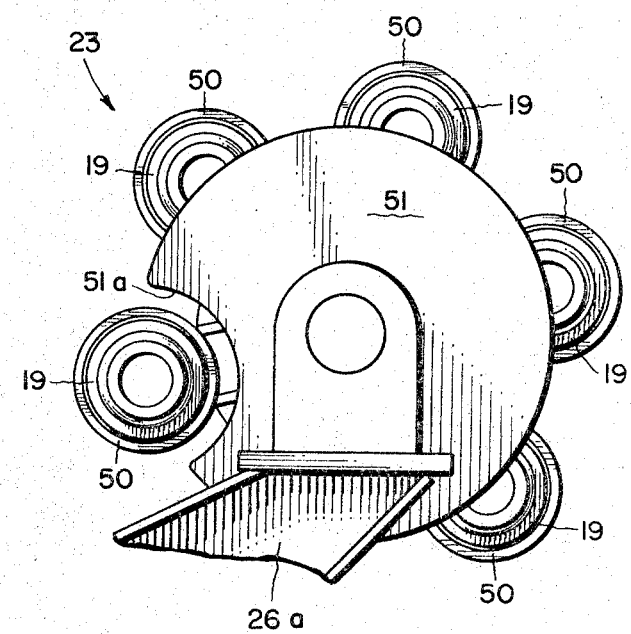
FIG. 9 is a longitudinal top view of the storage and handling apparatus taken on line 9—9 of FIG. 3B, looking in the direction of the arrows.

The entire rod changer 24 is then raised longitudinally by the hydraulic cylinder 58 such that the lower drill rod support 64 receives the drill rod 19, thereby actuating the trigger rod 72 to close the latch 65 on the upper drill rod support 61, and longitudinally moves the drill rod 19 through the cut-away portion 51a of the limiting plate 51 as shown in FIG. 5. The rod holder latch 42 which normally supports the lower end of the raised drill rod 19 passes through the slot 74 in the lower drill rod support 64 during this longitudinal movement of the rod changer 24 and is thus freed of both the drill rod 19 and the rod changer 24. The air valve (not shown) which controls the pneumatic cylinders 34 is then actuated to supply compressed air thereto to pivot the freed rod holder latch 42 out of alignment with the rod changer 24 as shown in FIG. 6. The other pneumatic cylinders 34, as will be seen, are not actuated by this flow of compressed air due to the load imposed upon their respective rod holder latches 42 by the drill rods 19 thereon.

The rod changer 24 is lowered to its original position to enable its carried drill rod 19 to clear the upper rod supporting bracket 49 on the rod carrier 23 and is swung by the hydraulic actuator 57 to locate the drill rod 19 under the rotary drilling head 17. The drill rod 19 is then connected at its opposing longitudinal ends to the rotary drilling head 17 and the drill string in the drill hole in the conventional manner. The drill rods 19 remaining in the rod carrier 23 are individually added to the drill string as required through successive repetitions of the beforedescribed operation.

To remove a drill rod 19 from the drill string and relocate such within the rod carrier 23, the rod changer 24 is first rotated to receive the drill rod 19 from the drill string and then rotated towards the rod carrier 23 until the carried drill rod 19 engages and is received by the supporting bracket 32 on the rod carrier 23. The entire rod changer 24 is then raised to locate the drill rod 19 within the upper rod supporting bracket 49 on the rod carrier 23; and the pneumatic cylinder 34 which actuates the appropriate rod holder latch 42, having been previously actuated to permit the lower rod supporting bracket 32 to receive the drill rod 19, is deactuated. Thus, the rod holder latch 42 returns to its supporting position at the lower end of the drill rod 19, whereupon the rod changer 24 may be lowered and rotated to receive the next drill rod 19 to be returned to the rod carrier 23. The rod carrier 23 is rotated in a counterclockwise direction after each receipt of a drill rod 19 to accept the succeeding drill rod 19. In this manner, the drill rods 19 are individually returned by the rod changer 24 from the drill string and stored on the rod carrier 23.

The storage and handling apparatus 22' illustrated in FIGS. 10 through 12 (wherein all components similar to those previously described are designated by primed reference characters) is generally similar to the storage and handling apparatus 22 shown in FIGS. 1 through 9 except that, in the former, the rod changer 24' is longitudinally stationary and the rod carrier 23' is longitudinally movable for the transfer of the drill rods 19 between the rod changer 24' and the rod carrier 23'. More specifically, as shown in FIGS. 10 through 12, the tubular supporting member 25' of the rod carrier 23' is slidably mounted within a vertically extending sleeve 75 carried by the supporting arm 26' and is similarly slidably mounted within the supporting arms 26a' and 26b'. The hydraulic actuator 76 for rotating the rod carrier 23' is located at the upper end thereof and rotatably drives the rod carrier 23' through a vertically depending shaft 77 splined at 78 to the tubular supporting member 25', thereby allowing longitudinal movement of the tubular supporting member 25'.

A hydraulic cylinder 79 is carried by the supporting arm 26' and has a piston 79a operatively connected to the lower end of the tubular supporting member 25'. The hydraulic cylinder 79 raises and lowers the tubular supporting member 25' within the vertically extending sleeve 75 on the supporting arm 26' to cause the drill rods 19 stored in the rod carrier 23' to be lowered by, or alternatively raised by, the rod carrier 23'. The hydraulic cylinder 79, the hydraulic actuator 57, and the hydraulic actuator 76, as in the previously described storage and handling apparatus 22, may be controlled by a single control valve (not shown) for purposes of simplicity and ease of control.

In the operation of the storage and handling apparatus 22', to add a drill rod 19 stored in the rod carrier 23' to the drill string, the rod carrier 24' is rotated to locate the aligned upper and lower drill rod supports 61' and 64', respectively, adjacent the rod carrier 23'. The rod carrier 23' is rotated to locate the leading drill rod 19 therein in alignment with the supports 61' and 64' on the rod changer 24'. Then the rod carrier 23' is lowered to simultaneously locate the drill rod 19 in the lower rod support 64' and lock the drill rod 19 in the upper rod support 61', while freeing the rod holder latch 42 from the drill rod 19. The rod carrier 23' is raised to free it of the drill rod 19, whereupon such may be transferred to the rotary drilling head 17 in a manner believed to be apparent from the foregoing description of the storage and handling apparatus 22 shown in FIGS. 1 through 9. The other drill rods 19 carried by the rod carrier 23' are loaded in a similar manner, and reloading of the drill rods 19 in the rod carrier 23' is accomplished by a reversal of this process.

From the foregoing, it will be seen that we have provided a new and improved drill rod storage and handling apparatus for adding and removing drill rods from a drill string which, while being constructed and arranged such that one man working alone may readily and easily add and remove such drill rods from the drill string, requires only that a single drill rod being transferred thereto, or therefrom, be moved over the drill hole. Also, from the foregoing, it will be seen that this new and improved drill rod storage and handling apparatus which we have provided does not interfere with the use of the drilling apparatus for angle hole drilling and is relatively simple and economical in construction.

From the foregoing, it will be seen that we have provided new and improved means for accomplishing all of the objects and advantages of our invention.

Having thus described an invention, we claim:

1. In combination with a drilling apparatus having a ground supported base, a shiftable tower supported by said base for movement to a substantially vertical position thereon, and a drilling means carried by said tower for driving a drill string formed from a plurality of longitudinally connected drill rods, means for storing and handling said drill rods comprising:
   a rack carried by said tower for rotation thereon in axially spaced relationship to said drilling means and having means thereon for longitudinally supporting a plurality of said drill rods;
   first power means operatively connected to said rack for rotating said rack to vary the positions of said supporting means thereon relative to said drilling means;
   transfer means having means thereon for supporting a single drill rod carried by said tower for rotation thereon to locate said single drill rod supporting means in alternative axial alignment with said supporting means on said rack and said drilling means;
   second power means operatively connected to said transfer means for rotating said transfer means to locate said single drill rod supporting means thereon in said alternative axial alignment with said supporting means on said rack and said drilling means;
   one of said rack and said transfer means being axially movable upon said tower for transferring said drill rods between said supporting means on said rack and said single drill rod supporting means on said transfer means when said latter supporting means has been rotated into axial alignment with said former supporting means; and
   third power means operatively connected to said axially movable one of said rack and said transfer means for actuating said axial movement thereof.

2. In combination with a drilling apparatus having a ground supported base, a shiftable tower supported by said base for movement to a substantially vertical position thereon, and a drilling means carried by said tower for driving a drill string formed from a plurality of longitudinally connected drill rods, means for storing and handling said drill rods comprising:
   a rack longitudinally carried by said tower for rotation about a fixed longitudinal axis thereon in axially spaced relationship to said drilling means and having means thereon for longitudinally supporting a plurality of said drill rods;
   first power means operatively connected to said rack for rotating said rack to vary the positions of said supporting means thereon relative to said drilling means;
   transfer means having means thereon for supporting a single drill rod longitudinally carried by said tower intermediate said rack and said drilling means for rotation thereon to locate said single drill rod supporting means in alternative axial alignment with said supporting means on said rack and said drilling means;
   second power means operatively connected to said transfer means for rotating said transfer means to locate said single drill rod supporting means thereon in said alternative axial alignment with said supporting means on said rack and said drilling means;
   one of said rack and said transfer means being axially movable upon said tower for transferring said drill rods between said supporting means on said rack and said single drill rod supporting means on said transfer means when said latter means has been rotated into axial alignment with said former supporting means; and
   third power means operatively connected to said axially movable one of said rack and said transfer means for actuating said axial movement thereof.

3. In combination with a drilling apparatus having a ground supported base, a shiftable tower supported by said base for movement to a substantially vertical position thereon, and a drilling means carried by said tower for driving a drill string formed from a plurality of longitudinally connected drill rods, means for storing and handling said drill rods comprising:
   a rack carried by said tower for rotation thereon in axially spaced relationship to said drilling means and having means thereon for longitudinally supporting a plurality of said drill rods;
   first power means operatively connected to said rack for rotating said rack to vary the positions of said supporting means thereon relative to said drilling means;
   transfer means having means thereon for supporting a single drill rod carried by said tower for rotation thereon to locate said single drill rod supporting means in alternative longitudinal alignment with said supporting means on said rack and said drilling means;
   second power means operatively connected to said transfer means for rotating said transfer means to locate said single drill rod supporting means thereon in said alternative longitudinal alignment with said supporting means on said rack and said drilling means;
   one of said rack and said transfer means being longitudinally movable upon said tower for transferring said drill rods between said supporting means on said rack and said single drill rod supporting means on said transfer means when said latter supporting means has been rotated into longitudinal alignment with said former supporting means; and
   third power means operatively connected to said longitudinally movable one of said rack and said transfer means for actuating said longitudinal movement thereof.

4. In combination with a drilling apparatus having a ground supported base, a shiftable tower supported by said base for movement to a substantially vertical position thereon, and a drilling means carried by said tower for driving a drill string formed from a plurality of longitudinally connected drill rods, means for storing and handling said drill rods comprising:
   a rack carried by said tower for rotation thereon in axially spaced relationship to said drilling means and having means thereon for longitudinally supporting a plurality of said drill rods;

first power means operatively connected to said rack for rotating said rack to vary the positions of said supporting means thereon relative to said drilling means;

transfer means having means thereon for supporting a single drill rod carried by said tower for rotation thereon to locate said single drill rod supporting means in alternative longitudinal alignment with said supporting means on said rack and said drilling means;

second power means operatively connected to said transfer means for rotating said transfer means to locate said single drill rod supporting means thereon in said alternative longitudinal alignment with said supporting means on said rack and said drilling means;

said transfer means being longitudinally movable upon said tower for transferring said drill rods between said supporting means on said rack and said single drill rod supporting means on said transfer means when said latter supporting means has been rotated into longitudinal alignment with said former supporting means; and third power means operatively connected to said transfer means for actuating said longitudinal movement thereof.

5. In combination with a drilling apparatus having a ground supported base, a shiftable tower supported by said base for movement to a substantially vertical position thereon, and a drilling means carried by said tower for driving a drill string formed from a plurality of longitudinally connected drill rods, means for storing and handling said drill rods comprising:

a rack carried by said tower for rotation thereon in axially spaced relationship to said drilling means and having means thereon for longitudinally supporting a plurality of said drill rods;

first power means operatively connected to said rack for rotating said rack to vary the positions of said supporting means thereon relative to said drilling means;

transfer means having means thereon for supporting a single drill rod carried by said tower for rotation thereon to locate said single drill rod supporting means in alternative longitudinal alignment with said supporting means on said rack and said drilling means;

second power means operatively connected to said transfer means for rotating said transfer means to locate said single drill rod supporting means thereon in said alternative longitudinal alignment with said supporting means on said rack and said drilling means;

said rack being longitudinally movable upon said tower for transferring said drill rods between said supporting means on said rack and said single drill rod supporting means on said transfer means when said latter supporting means has been rotated into longitudinal alignment with said former supporting means; and third power means operatively connected to said rack for actuating said longitudinal movement thereof.

6. In combination with a drilling apparatus having a ground supported base, a shiftable tower supported by said base for movement to a substantially vertical position thereon, and a drilling head carried by said tower for driving a drill string formed from a plurality of longitudinally connected drill rods into a drill hole, means for storing and handling said drill rods comprising:

a rack longitudinally carried by said tower in axially spaced relationship to said drilling head for rotation about a fixed longitudinal axis on said tower and having a plurality of spaced supporting portions for storing said plurality of drill rods in spaced relationship;

first fluid actuated means operatively connected to said rack for rotating said rack around said fixed longitudinal axis to vary the positions of said supporting portions thereon relative to said drilling head;

a rod changer having a plurality of aligned supporting portions longitudinally carried by said tower and rotatable upon said tower intermediate said rack and said drilling head to locate said aligned supporting portions in alternative longitudinal alignment with said supporting portions of said rack and said drilling head;

second fluid actuated means operatively connected to said rod changer for rotating said rod changer to locate said aligned supporting portions thereon in said alternative longitudinal alignment with said supporting portions of said rack and said drilling head;

one of said rack and said rod changer being longitudinally movable upon said tower to transfer drill rods between said supporting portions of said rack and said aligned supporting portions of said rod changer when said aligned supporting portions of said rod changer are in longitudinal alignment with said supporting portions of said rack; and third fluid actuated means operatively connected to said one of rod changer and said rack which is longitudinally movable for actuating said longitudinal movement thereof.

7. In combination with a drilling apparatus having a ground supported base, a shiftable tower supported by said base for movement to a substantially vertical position thereon, and a drilling head carried by said tower for driving a drill string formed from a plurality of longitudinally connected drill rods into a drill hole, means for storing and handling said drill rods comprising:

a rack longitudinally carried by said tower in axially spaced relationship to said drilling head for rotation about a fixed longitudinal axis on said tower and having a plurality of spaced supporting portions for storing said plurality of drill rods in spaced relationship;

first fluid actuated means operatively connected to said rack for rotating said rack around said fixed longitudinal axis to vary the positions of said supporting portions thereon relative to said drilling head;

a rod changer having a plurality of aligned supporting portions carried longitudinally upon said tower intermediate said rack and said drilling head for rotation upon said tower to locate said aligned supporting portions thereon in alternative longitudinal alignment with said supporting portions of said rack and said drilling head;

second fluid actuated means operatively connected to said rod changer for rotating said rod changer to locate said aligned supporting portions thereon alternatively in longitudinal alignment with said supporting portions of said rack and said drilling head;

said rack being longitudinally movable upon said tower to transfer drill rods between said supporting portions thereon and said supporting portions of said rod changer when said rod changer is in longitudinal alignment with said rack; and third fluid actuated means operatively connected to said rack for actuating said longitudinal movement thereof.

8. In combination with a drilling apparatus having a ground supported base, a shiftable tower supported by said base for movement to a substantially vertical position thereon, and a drilling head carried by said tower for driving a drill string formed from a plurality of longitudinally connected drill rods into a drill hole, means for storing and handling said drill rods comprising:

a rack longitudinally carried by said tower in axially spaced relationship to said drilling head for rotation about a fixed longitudinal axis on said tower and having a plurality of spaced supporting portions for storing said plurality of drill rods in spaced relationshinp;

first fluid actuated means operatively connected to said rack for rotating said rack around said fixed longitudinal axis to vary the positions of said supporting portions thereon relative to said drilling head;

a rod changer having a plurality of aligned supporting portions carried longitudinally upon said tower intermediate said rack and said drilling head for rotation upon said tower to locate said aligned supporting portions thereon in alternative longitudinal alignment with said supporting portions of said rack and said drilling head;

second fluid actuated means operatively connected to said rod changer for rotating said rod changer to locate said aligned supporting portions thereon alternatively in longitudinal alignment with said supporting portions of said rack and said drilling head;

said rod changer being longitudinally movable upon said tower to transfer drill rods between said supporting portions thereon and said supporting portions of said rack when said rod changer is in longitudinal alignment with said rack; and third fluid actuated means operatively connected to said rod changer for actuating said longitudinal movement thereof.

9. In combination with a drilling apparatus having a ground supported base, a shiftable tower supported by said base for movement to a substantially vertical position thereon, and a drilling head carried by said tower for driving a drill string formed with from a plurality of longitudinally connected drill rods into a drill hole, means for storing and handling said drill rods comprising:

a rack longitudinally carried by said tower in axially spaced relationship to said drilling head for rotation about a fixed longitudinal axis on said tower and having a plurality of peripheral, arcuately arranged supporting portions for storing said plurality of drill rods in arcuately spaced relationship;

first fluid actuated means operatively connected to said rack for rotating said rack around said fixed longitudinal axis to vary the positions of said supporting portions thereon relative to said drilling head;

a rod changer having a plurality of aligned supporting portions carried longitudinally upon said tower intermediate said rack and said drilling head for rotation upon said tower to locate said aligned supporting portions thereon in alternative longitudinal alignment with said supporting portions of said rack and said drilling head;

second fluid actuated means operatively connected to said rod changer for rotating said rod changer to locate said aligned supporting portions thereon alternatively in longitudinal alignment with said supporting portions of said rack and said drilling head;

said rod changer being longitudinally movable upon said tower to transfer drill rods between said supporting portions thereon and said supporting portions of said rack when said rod changer is in longitudinal alignment with said rack; and third fluid actuated means operatively conected to said rod changer for actuating said longitudinal movement thereof.

References Cited

UNITED STATES PATENTS

| 3,025,918 | 3/1962 | Leven | 175—85 X |
| 3,185,310 | 5/1965 | Klem | 211—60 |
| 3,212,593 | 10/1965 | Reischl | 175—85 |
| 3,286,777 | 11/1966 | Gyongyosi | 175—85 X |
| 3,312,294 | 4/1967 | Wilson | 175—85 X |

CHARLES E. O'CONNELL, *Primary Examiner.*

NILE C. BYERS, *Examiner.*